C. H. OCUMPAUGH.
CURTAIN FASTENER.
APPLICATION FILED FEB. 14, 1914.
1,178,339.
Patented Apr. 4, 1916.
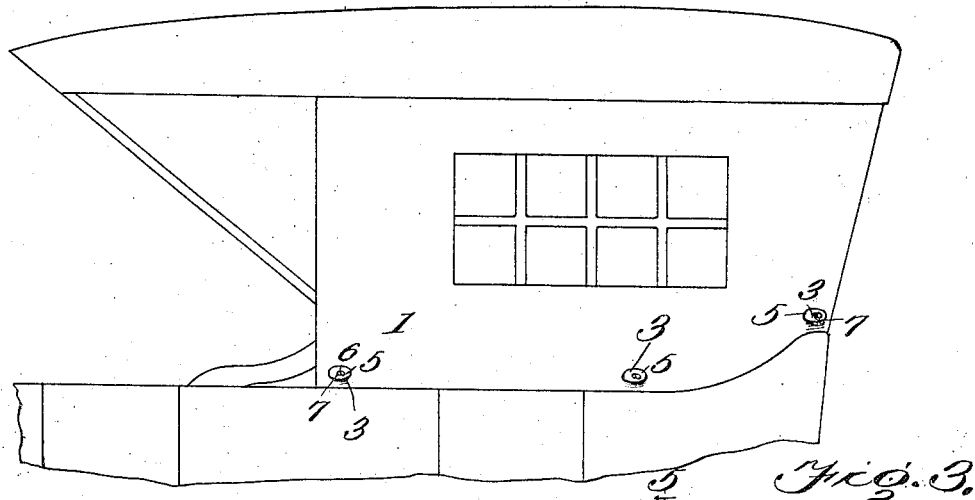
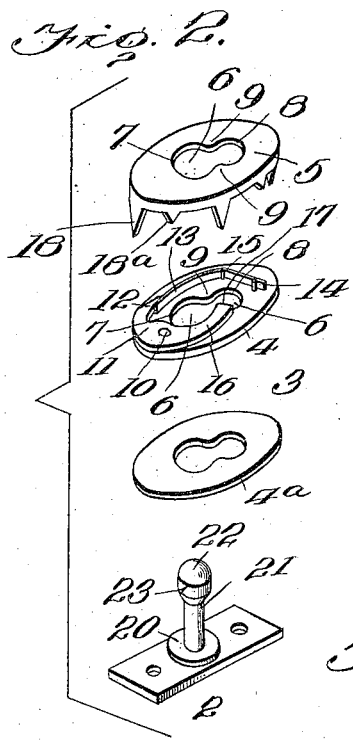
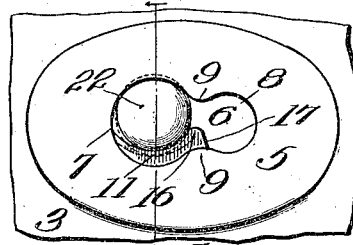
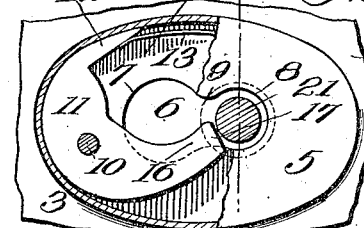

UNITED STATES PATENT OFFICE.

CHARLES HERBERT OCUMPAUGH, OF ROCHESTER, NEW YORK.

CURTAIN-FASTENER.

1,178,339. Specification of Letters Patent. Patented Apr. 4, 1916.

Application filed February 14, 1914. Serial No. 818,782.

*To all whom it may concern:*

Be it known that I, CHARLES HERBERT OCUMPAUGH, citizen of the United States, residing at Rochester, in the county of Monroe and State of New York, have invented certain new and useful Improvements in Curtain-Fasteners; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in curtain fasteners, used primarily in connection with automobiles, and other moving vehicles.

The object of the invention is to provide means which will enable an automobile operator to quickly fasten the curtains without leaving the car, and to provide means which will insure of the fastener securing the curtain, when the latter is swayed by the wind.

A further object of the invention is to provide a double seat for the head of the fastener so as to receive the head temporarily, and subsequently receive said head to positively lock it in position. The construction of this feature of my invention is of the utmost importance, for it serves to permit an operator to insert the head in one seat to temporarily hold the parts together, and then by giving the female member a slight lateral pull the head is permanently held in the second seat and the fastener cannot become detached, for any outward pull only serves to draw the smaller portion of the seat against the head and accidental displacement of the parts is prevented.

The invention also comprehends improvements in the details of construction and arrangement of parts which will be hereinafter described and particularly pointed out in the claims.

In the drawings: Figure 1 is a view illustrating the application of my invention. Fig. 2 is a perspective view, the several parts being separated. Fig. 3 is a plan view illustrating the head of the male member as entering the opening of the female member. Fig. 4 is a plan view partially in horizontal section, illustrating the male member in its final seat. Fig. 5 is a transverse section on the line 5—5, Fig. 3. Fig. 6 is a similar section on the line 6—6, Fig. 4, the shank and head of the male member being shown in dotted lines.

1 designates a curtain which is secured by my improved fastener. The fastener comprises a male member 2, and a female member 3. The female member is formed of a base plate 4, and a housing 5, each of which is provided with an alined opening or seat 6. Each opening 6, is elongated, and at one end it is enlarged as at 7, to preliminarily receive the male member, and at its opposite end it is reduced as at 8, to finally receive the male member, the elongated opening being restricted between the enlarged and reduced end by inwardly projecting lugs 9. The edges of these lugs are curved to conform to the curvature of the walls of enlarged and reduced ends, as clearly shown in the drawing. Pivoted at 10 to the outer surface of the base plate 4 of the female portion is a curved locking lever 11, the two opposite ends of which are substantially opposite each other. Bearing against the inner side of the tail end 12, of this lever is a spring 13, secured at its opposite end at 14, to said base plate, and passing around a post 15, disposed intermediate the ends of said spring. The function of this spring is to normally hold the outer or head end 16 of the lever over the edge of the elongated openings 6. The inner edge of the head 16, of the lever conforms approximately to the curvature of the edge wall of the enlarged portion 7, of the opening, and the forward edge is beveled, as at 17. This head normally lies over the lugs 9, on one side of the opening 6.

The housing is of sufficient depth to incase the lever and spring, and is provided on its edges with prongs 18 and 18ª. The base is located within the housing and is secured thereto by the prongs 18ª. Then the housing including the base is placed on the outside of the curtain, and the prongs 18 are forced therethrough and clenched on the opposite side to embrace the edges of a plate 4ª, as indicated at 19, plate 4ª having an opening corresponding to opening 6. When the parts of the female member are thus assembled, it is obvious that the locking lever projects beyond the wall of the enlarged portion and the lugs 16 of the opening 6, and greatly restricts said opening.

The male member comprises a base 20, and a stem 21, the outer end of the latter being enlarged to form a head 22. The upper end of the head is semi-spherical, and merges into straight side walls, indicated at 23, from the bottom of which the under surface is beveled and merges into the stem. Hence the head is in reality beveled at the top and bottom to facilitate insertion and withdrawal through the opening 6.

In operation, the enlarged portion 7 of opening 6, of the female member is slipped over the head of the male member, the upper semi-spherical end readily forcing the locking lever to one side, then immediately the head is through the opening the spring turns the lock back to normal position and against the stem. The head is now temporarily held to the female member, but obviously because of the under beveled surface of the head a slight outward pull on the female member would disengage same from the male member. Once the male member is engaged with the female member as thus far described, the female member is drawn laterally in direction of the reduced portion 8 of slot 6, and in so doing the stem 21 engages with the head of the locking lever and forces said locking lever out of the way. Immediately the head of the locking lever passes the stem, the spring returns it to its normal position, and the beveled edge 17 seats behind the stem and confines it in the reduced end 8 of opening 6. The opening formed by the reduced portion 8, and the end of the locking lever, is of less diameter than the diameter of the head, hence any outward pull of the female member will not disengage or cause disengagement of the two members. Then again, if the female member should be reversely moved, the beveled end of the head of the locking lever will offer resistance, and prevent the stem passing into the enlarged portion 8 of the opening 6. The resistance between the stem and the housing is materially augmented by the lugs 9, for obviously they will, with the end of the locking lever, act as a barrier to the lateral movement of the female member. This is particularly true when it is considered that the restricted portion of opening 6, between the lugs is only sufficient for the passage of the stem. Hence, if the female member be moved a little to one side of the center of the elongated opening 6, it will contact with one of the lugs 9 and further movement will be resisted. Even though the female member be moved in a straight line, one or the other of the lugs will offer resistance, for the locking lever tends to hold the stem in close contact with the walls of the reduced portion 8 of the opening. Of course, it must be understood that undue resistance of the stem against the locking lever will turn the latter, but such pressure is more than would occur from the lateral thrust of the curtain, the parts being so proportioned that manual movement of the female member is necessary to accomplish the result.

It is to be noted that in applying the fasteners, the reduced ends of the openings in opposite fasteners are located at the edges of the curtain, so that when the wind gets under the curtain and blows the latter out, the female members cannot possibly become disengaged from the heads of the stems, for as previously stated, the diameter of each head is greater than the diameter of its seat. To disengage the female member from a male member, the former is moved laterally to bring the beveled end 17, of the locking lever against the stem, and the latter moves the lever out of its path, until the enlarged portion 7, of slot 6, is reached, whereupon the locking lever under the influence of its spring will again assume normal position. Now, while it is true the locking lever will still hold the female member to the male member, to disengage the members, it is first necessary to remove said locking member. By exerting an outward pull on the female member, the bottom beveled portion of the head will engage the projecting portion of the locking lever, and will force the latter out of the way, whereupon the female member may be withdrawn.

It is of the utmost importance that the head be formed as described, inasmuch as the fundamental purpose of my invention is to provide a fastener which can be secured or released without the necessity of the operator moving an auxiliary lever or subsidiary device. Furthermore, the head must of necessity be semi-spherical in order to effectually engage and move the locking lever. The head must have a flat portion between the beveled portions, for in the absence of this feature a sharp edge would be formed and would, when coupling the parts, abut against the lever, or engage the walls of the housing, and in time disfigure the same. Therefore, to avoid this difficulty, and to allow the head to act gradually on the edge of the locking lever, I find the construction described admirably adapted for the purpose.

What I claim is:—

1. A two part fastener comprising a male member having a stem and a head, and a female member having an elongated opening smaller at one end than at the other, a locking lever pivotally mounted in the female member and having a part normally extending into the area of the two portions of the elongated opening, the head adapted to pass through the larger portion of the opening and partly displace the locking lever to temporarily hold the two members together, the stem subsequently adapted to engage in the smaller portion of the opening and be retained therein by the end of the locking lever and the walls of the opening.

2. A two part fastener comprising a male member having a stem and a head, said head having a semi-spherical top and a beveled portion, a female member having an elongated opening which is larger at one end than at the other, and is restricted between the said portions, a spring actuated locking lever in the female member which normally extends partly across the restricted portion and area of the larger opening, whereby the head may be lightly held in the enlarged portion or may be more securely engaged in the smaller portion of said opening and retained therein by the locking lever.

In testimony whereof I have signed my name to this specification in the presence of two subscribing witnesses.

C. HERBERT OCUMPAUGH.

Witnesses:
JAS. W. BACKUS,
A. K. MADDEN.

Copies of this patent may be obtained for five cents each, by addressing the "Commissioner of Patents, Washington, D. C."